United States Patent Office 3,437,647
Patented Apr. 8, 1969

3,437,647
HALOGEN ADDUCTS OF ALKYLATED POLYMERS OF HETEROCYCLIC N-VINYL MONOMERS
Milton Freifeld, Easton, Pa., assignor to GAF Corporation, a corporation of Delaware
No Drawing. Filed Mar. 4, 1966, Ser. No. 531,760
Int. Cl. C08d 27/02, 27/00; A61l 13/00
U.S. Cl. 260—88.3                                     7 Claims

ABSTRACT OF THE DISCLOSURE

Stable halogen adduct compositions are provided which are essentially insoluble in water, but soluble in organic solvents, such as alcohols, hexane, mineral oils, paraffin waxes, etc., and which are obtained by complexing with iodine, iodine mono-bromide or iodine monochloride, an alkylated polymer of a 5- to 7-membered heterocyclic N-vinyl monomer, having a carbonyl function adjacent to the nitrogen in its heterocyclic moiety and containing in at least one of said moieties an alkyl group of from 6 to 42 carbon atoms. The halogen content in the adduct ranges from about 1% to about 30% by weight of the alkylated polymer.

This invention relates to a new and useful class of stable halogen adducts of alkylated polymers of heterocyclic N-vinyl monomers having germicidal, bactericidal, fungicidal and disinfecting properties.

It is well known that polyvinylpyrrolidone, which is water soluble, is physiologically acceptable to animals and humans. It is also known that iodine is strongly complexed by polyvinylpyrrolidone to yield a powder which retains the germicidal and chemical nature of the iodine, yet it is more water soluble than iodine alone. As a consequence, the polyvinylpyrrolidone-iodine complex provides a more stable form of iodine in solution than iodine alone or some of the more common iodine preparations such as tincture of iodine or Lugol's solution. The iodine present in the complex is not as irritating to tissue and mucosa as other iodine preparations of the same strength and the toxicity of the iodine is reduced.

It is also known that polyvinylpyrrolidone and copolymers of N-vinyl-2-pyrrolidone and other nonheterocyclic polymerizable monomers have also been complexed with iodine alone and with iodine monobromide and iodine monochloride to yield water soluble adducts.

It is the object of the present invention to provide a new and useful class of stable halogen adducts of alkylated polymers of heterocyclic N-vinyl monomers which are soluble in a wide range of organic solvents in which they display their germicidal, bactericidal, fungicidal and disinfecting properties.

Other objects and advantages will become evident from the following description:

I have discovered that halogens such as iodine, iodine mono-bromide and iodine monochloride, are readily complexed by alkylated polymers of heterocyclic N-vinyl monomers to yield adducts having germicidal, bactericidal, fungicilal and disinfecting properties when employed in organic solvents, in unctuous materials and as aqueous dispersions. The halogens present in the adducts are stable, organically linked, and not as irritating to tissue and mucosa as the halogen compounds, per se.

The halogen adducts are soluble in higher alcohols such as hexanol, myristol, fatty acids, polyalkyleneglycols, mineral oils, paraffin wax and other unctuous materials which are bases of various cosmetics, salves, and ointments.

The iodine adducts are ideally suitable for local application as germicides, bactericides, fungicides and antiseptics to the skin in emollients, creams, jellies, suppositories, and a variety of pharmaceutical salves and ointments.

The iodine monochloride and iodine monobromide adducts have excellent bleaching, deodorizing, sterilizing and disinfecting properties and can be employed in industrial and sanitary applications.

The alkylated polymers of heterocyclic N-vinyl monomers that are complexed with halogens in accordance with the present invention are (1) preformed polymers (homo- and co-polymers) of heterocyclic N-vinyl monomers containing a carbonyl function adjacent to the nitrogen in its heterocyclic moiety which are alkylated with an α-olefin of at least 2 carbon atoms, (2) copolymers of the said heterocyclic N-vinyl monomers with α-olefins of at least 2 carbon atoms wherein the same α-olefin copolymerizes with the heterocyclic N-vinyl monomer and alkylates one or more of the heterocyclic N-vinyl monomer moieties in the copolymer, and (3) terpolymers of (a) the said heterocyclic N-vinyl monomers, (b) monoethylenically unsaturated polymerizable monomers and α-olefins of at least 2 carbon atoms wherein at least one or more of the monomer moieties in (a) or (b) in the terpolymer are alkylated with an α-olefin of at least 2 carbon atoms.

The alkylated preformed polymers of (1) are prepared in accordance with the procedure described in the application of A. Merijan, F. Grosser and E. V. Hort, Ser. No. 508,547, filed Nov. 18, 1965, the entire specification of which is incorporated herein by reference thereto. In general, the procedure involves the heating of one mole of a homopolymer or copolymer of a heterocyclic N-vinyl monomer with 0.05 to 10 moles of an alpha-olefin of at least 2 carbon atoms in solution of an organic solvent common to the polymer and alpha-olefin in the presence of 0.025 to 0.30 mole of an organic peroxide catalyst per mole of alpha-olefin, at a temperature ranging from 100° to 200° C. for a period of time ranging from 3 to 60 hours.

The preformed homoplymers of heterocyclic N-vinyl monomers that are alkylated with an α-olefin of at least 2 carbon atoms in accordance with the foregoing procedure are those which contain a carbonyl function adjacent to the nitrogen in the heterocyclic moiety such as, for example, homopolymers of N-vinyl succinimide, N-vinyl diglycolylimide, N-vinyl glutarimide, N-vinyl-3-morpholinone, N-vinyl - 5 - methyl-3-morpholinone, N-vinyl-5-ethyl-3-morpholinone, N-vinyl oxazolidone, etc., and N-vinyl 5-, 6- and 7-membered lactams characterized by the following formula:

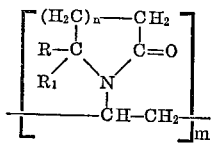

wherein R and $R_1$ are selected from the group consisting of hydrogen, methyl and ethyl, $n$ is an integer of from 1 to 3, and $m$ represents the average molecular weight as determined by relative viscosity measurements which are designated as K values.

The viscosity coefficient, K, which is fully described in Modern Plastics, 23, No. 3, 157–61, 212, 214, 216 and 218 (1945) is calculated as follows:

$$\frac{\log \eta_{rel}}{c} = \frac{75K_o^2}{1+1.5K_{oo}}$$

and $K = 1000K_o$ where $c$ is the concentration in grams per 100 ml. of polymer in solution and the $\eta_{rel}$ is the viscosity of the solution compared to solvent.

Other homopolymers containing a lactam ring that are alkylated with an α-olefin of at least 2 carbon atoms include those prepared by the homopolymerization of comparable monomers of N-vinyl 5-, 6- and 7-membered thiolactams, N-acryloylpyrrolidone, -piperidone and -caprolactam; N-acryloyl-5-methylpyrrolidone, N-acryloyl-6-methylpiperidone and N-acryloyl-7-methyl caprolactam and their corresponding 5-, 6- and 7-ethyl derivatives; N-acryloxy-methyl-pyrrolidone, -piperidone and -caprolactam; N-methacryloxy-ethyl-pyrrolidone, -piperidone and -caprolactam; N-methacryloxy-methyl - 5 - methyl-pyrrolidone, -6-methyl-piperidone and -7-methyl-caprolactam; N-methacrylamidomethyl-, N-methacrylamidoethyl-, N-methacrylamidopropyl- and N-(N-phenylacrylamidopropyl)-pyrrolidone, -piperidones and -caprolactams.

The homopolymers of the N-vinyl lactams characterized by the foregoing formula are readily obtained by homopolymerizing N-vinyl pyrrolidone; N-vinyl-5-methyl pyrrolidone; N-vinyl-5-ethyl pyrrolidone; N-vinyl-5,5-dimethyl pyrrolidone; N-vinyl-5,5-diethyl pyrrolidone and N-vinyl-5-methyl-5-ethyl pyrrolidone; N-vinyl piperidone; N-vinyl-6-methyl piperidone; N-vinyl-6-ethyl piperidone; N-vinyl-6,6-dimethyl piperidone; N-vinyl-6,6-diethyl piperidone and N-vinyl-6-methyl-6-ethyl piperidone; N-vinyl caprolactam, N-vinyl-7-methyl caprolactam; N-vinyl-7,7-dimethyl caprolactam; N-vinyl-7-ethyl caprolactam; N-vinyl-7,7-diethyl caprolactam and N-vinyl-7-methyl-7-ethyl caprolactam.

The preformed homopolymers of heterocyclic N-vinyl monomers of (1) prior to alkylation and complexing with halogens have a K value ranging from about 10 to 140, preferably from about 30 to 100. They are readily obtained by conventional homopolymerization procedures of the foregoing heterocyclic N-vinyl monomers described in United States Patents 2,265,450; 2,317,804; 2,335,454 and many others too numerous to mention in which working examples are given.

The preformed copolymers, i.e., copolymers of (1) prior to alkylation with α-olefins and complexing with halogens are those that are obtained by first copolymerizing 5 to 99 mole percent of the foregoing heterocyclic N-vinyl monomers with 1 to 95 mole percent of a monoethylenically unsaturated polymerizable monomer such as, for example, vinyl esters such as vinyl acetate, vinyl propionate, vinyl butyrate, vinyl isobutyrate, vinyl lactate, vinyl caproate, vinyl caprylate, vinyl oleate, and vinyl stearate; acrylonitrile; vinyl ketones; vinyl cyclohexane; styrene; 2-vinyl pyridine, 4-vinyl pyridine; acrylic acid; acrylate ester monomers of the formula

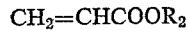

$$CH_2=CHCOOR_2$$

wherein $R_2$ represents either a straight or branched alkyl of from 1 to 18 carbon atoms or an alkoxyalkyl in which the total number of carbon atoms in the alkyl groups range from 3 to 6.

As examples of such acrylate esters, the following are illustrative: methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-methyl-2-pentyl, hexyl, 2-ethyl-hexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate; methacrylic monomers such as methacrylic acid, methyl methacrylate, cyclohexyl methacrylate, isobutyl methacrylate, isoamyl methacrylate, β-methoxy ethyl methacrylate and α-(o-chlorophenyl) ethyl methacrylate, β-phenoxyethyl methacrylate, α-phenylethyl methacrylate, phenyl methacrylate, o-cresyl methacrylate, p-cyclohexylphenyl methacrylate, 2-nitro-2-methyl propyl methacrylate, diethylaminoethyl methacrylate, ethylidene acetate methacrylate and glycidyl methacrylate, including esters of halo acrylic acids, such as methyl-2-chloro-acrylate, ethyl-α-chloro-acrylate, phenyl-α-chloro-acrylate, α-ethylacrylic acid; methacrylonitrile; N-alkyl and N-aryl substituted acrylamides such as N-methyl acrylamide, N-ethyl acrylamide, N-propyl acrylamide, N-n-butyl acrylamide, N-n-dodecyl acrylamide, N-n-octadecyl acrylamide, N,N-dimethyl acrylamide, N,N-diethyl acrylamide, N,N-di-n-butyl acrylamide, N,N-di-isobutyl acrylamide, N-cyclohexyl acrylamide, N,N-dicyclohexyl acrylamide, N-phenyl acrylamide, N-p-nitro-phenyl acrylamide, N-α-naphthyl acrylamide, N-β-naphthyl acrylamide, N-methyl-N-phenyl acrylamide, N,N-diphenyl acrylamide, N-benzyl acrylamide, N,N-di-benzyl acrylamide; and grafted monomers of the type disclosed in United States Patents 3,029,219, 3,035,009, 3,036,033 and the like.

A mixture consisting of from 5 to 99 mole percent of any one of the foregoing heterocyclic N-vinyl monomers and from 1 to 95 mole percent of a different heterocyclic N-vinyl monomer such as, for example, N-vinyl lactam with either N-vinyl succinimide, N-vinyl-3-morpholinone, and the like, may also be copolymerized to a K value from about 10 to 140. The resulting copolymer is alkylated with an α-olefin of at least 2 carbon atoms in accordance with the procedure of said Ser. No. 508,547, and then complexed with a halogen as will be pointed out hereinafter.

The alkylated copolymers of (2) employed in accordance with the present invention are those that are obtained by the simultaneous copolymerization and alkylation as described in the application of A. Merijan and F. Grosser, Ser. No. 508,546, filed Nov. 18, 1965, the entire specification of which is incorporated by reference thereto. In general, the procedure involves treating one mole of a heterocyclic N-vinyl monomer with 0.05 to 10 moles of an α-olefin of at least 2 carbon atoms in solution of an organic solvent common to the monomer and the α-olefin in the presence of 0.025 to 0.30 mole of an organic peroxide catalyst per mole of α-olefin at a temperature ranging from 80° to 200° C. for a period of time ranging from 3 to 60 hours. The resulting solution of copolymerized and alkylated copolymer may be employed as such or, if desired, the organic solvent may be removed by vacuum distillation. The solubility of the resulting copolymer in polar solvents decreases and the solubility in non-polar solvents increases as the molar ratio of α-olefin to heterocyclic N-vinyl monomer increases. In other words, alkylated copolymers are obtained in which some or all of the heterocyclic N-vinyl moieties contain one or more alkyl groups of from at least 2 carbon atoms to as many carbon atoms as is contained in the α-olefin employed in the reaction.

The alkylated terpolymers of (3) employed in accordance with the present invention are those that are obtained by the simultaneous terpolymerization and alkylation of a mixture containing a heterocyclic N-vinyl monomer, monoethylenically unsaturated polymerizable monomer illustrated above and an α-olefin of at least 2 carbon atoms or a mixture of two different heterocyclic N-vinyl monomers and α-olefin as described in the application of A. Merijan and F. Grosser, Ser. No. 525,374 filed Feb. 7, 1966, the entire specification of which is incorporated by reference thereto. In general, the procedure involves heating one mole of a mixture of monomers containing from 5 to 99 mole percent of a heterocyclic N-vinyl monomer having a carbonyl function adjacent to the nitrogen in its heterocyclic moiety and from 1 to 95 mole percent of a polymerizable monoethylenically unsaturated monomer with 0.05 to 10 moles of an α-olefin of at least 2 carbon atoms in solution of an inert organic solvent common to the mixture of monomers and α-olefin in the presence of 0.025 to 0.30 mole of an organic peroxide catalyst per mole of α-olefin at a temperature ranging from 80° C. to 200° C. for a period of time of from 3 to 60 hours.

Any α-olefin having a molecular weight from about 25 to as high as 2500 may be employed in the alkylation of preformed homopolymers and copolymers of (1), in the simultaneous copolymerization and alkylation of heterocyclic N-vinyl monomers with the same α-olefin of (2) and in the simultaneous terpolymerization and alkylation of (3). In other words, α-olefins ranging from ethene (ethylene) to as high as polybutenes having molecular weights from 400 to 2500 may be employed. As examples of such α-olefins, the following are illustrative: ethene; propene; 1-butene; 1-pentene; 2-ethyl-1-butene; 2-methyl-1-pentene; 1-hexene; 5-methyl-1-hexene; 2-methyl-1-pentene; 1-hexene; 5-methyl-1-hexene; 2-methyl-1-pentene; 3-ethyl-1-pentene; 1-heptene; 1-octene; 1-nonene; 2-ethyl-1-hexene; 1-decene; 1-dodecene; 1-tetradecene; 1-hexadecene; 1-heptadecene; 1-octadecene; 1-nonadecene; 1-eicosen; 1-docosene; 1-tetracosene; 1-pentacosene trimerized α-tetradecene and polybutenes of molecular weight of 400 to 2500 may be used While linear α-olefins are preferred because of their commercial availability numerous isomers of α-olefins ranging from 1-pentene to 1-pentacosene as well as polybutenes may also be employed in the reaction The only precaution required in such case is that the isomer contain an ethylenic unsaturation in the α-position thereof.

A mixture of commercially available linear α-olefins produced by cracking petroleum wax or by polymerizing lower olefins may also be used as the comonomer and alkylating agent Alpha-olefins in the carbon range of from $C_6$–$C_7$; $C_7$–$C_9$; $C_9$–$C_{11}$; $C_{11}$–$C_{15}$; and $C_{15}$–$C_{20}$ are commercially available and contain from 81 to 87 weight percent of straight-chain α-olefins; from <0.5 to 2 weight percent of straight-chain internal olefins; from 13 to 3 weight percent of branched and naphthenic olefins; from 2 to 4 weight percent of paraffins and naphthenes and from 1 to <1 of aromatics, respectively. A mixture of α-olefins containing from 65–75% of α-olefins of from $C_{20}$ to $C_{42}$ and having an average molecular weight of 366 is also commercially available and such mixture is employed in the reaction.

An organic solvent is employed in the reaction of preparing alkylated polymers of the type of (1), (2) and (3) above described. As solvents, various alcohols, such as methanol, ethanol, propanol, isopropanol, butanol, sec-butanol, amyl alcohol, hexanol, 2-ethyl-1-hexanol, ethylene glycol, 1,2-butanediol, 4-butanediol, etc., may be employed. Other inert solvents such as diethylene glycol, ethylene glycol monomethyl ether and the like may also be employed. It is to be noted that the nature or character of the organic solvent is immaterial so long as it forms a solution with the polymer and alkylating alpha-olefin(s) and is not susceptible to alkylation.

As peroxide catalyst (initiator) for the alkylation and polymerization reaction, any one of the known tertiary-alkyl organic peroxides and hydroperoxides such as, for example, di-t-butyl peroxide, t-butyl perbenzoate, di-t-butyl peroxide, t-butyl perbenzoate, di-t-butyl perphthalate, t-butyl-pentamethyl-ethyl peroxide, t-butyl-triphenylmethyl peroxide, di-t-amyl peroxide bis(triethylmethyl)peroxide, bis(triphenylmethyl)peroxide, 2,5-dimethyl-hexyl-2,5-dihydroperoxide, 2,5-dimethyl-2,5-di(t-butylperoxy)hexane, 2,5-dimethylhexyl - 2,5 - di(peroxy benzoate), t-butyl hydroperoxide, para-menthane hydroperoxide and the like may be used.

When one mole of α-olefin of at least 2 carbon atoms is employed per mole equivalent of preformed homo- and copolymers of heterocyclic N-vinyl monomers of type (1), at least 50% to as high as 100% of the heterocyclic N-vinyl monomer moieties will contain an alkyl substituent of at least 2 carbon atoms to as many carbon atoms as is contained in the α-olefin employed in the alkylation reaction. The same applies to copolymers and terpolymers of types (2) and (3). In the latter case, while the three component mixture is being terpolymerized, the same α-olefin alkylates one or more active sites of the heterocyclic N-vinyl monomer moiety as well as one or more active sites in the polymerizable monoethylenically unsaturated comonomer in the terpolymer. In other words, the α-olefin terpolymerizes with the heterocyclic N-vinyl monomer and the monethylenically unsaturated monomer. While the three (3) component mixture is being terpolymerized, the same α-olefin also alkylates one or more active sites of the heterocyclic N-vinyl monomer moiety as well as the other comonomer in the terpolymer by an alkyl group of the number of carbon atoms contained in the α-olefin employed in the reaction.

The stable halogen complexes of the foregoing alkylated polymers of the type (1), (2) and (3) are prepared by dry blending, such as by grinding in a pebble or ceramic ball mill lined with polyethylene, the alkylated polymer with 1 to 75% based on the weight of the alkylated polymer of a halogen compound such as iodine, iodine monochloride or iodine monobromide for a period of time until a uniform dispersion is obtained. The time may range from 2 to 48 hours. The dispersion is then heated at a temperature ranging from 30° to 100° C., preferably at about 90° C. depending upon the particular alkylated polymer, the adduct may melt when heated. If so, the melt is allowed to cool in the mill to room temperature and the mass reground. The yellow-orange reground powder or viscous liquid is recovered from the mill and used in the formulation of a wide variety of compositions.

The alkylated polymers of the heterocyclic N-vinyl monomers can be ground with elemental iodine and heat treated as above until as high as 80% by weight of iodine is incorporated therein to yield a stable homogenous adduct in which the iodine is combined, i.e., organically linked. A 10% solution of the polymeric-iodine adduct containing about 5% of total iodine based on the weight of the alkylated polymer in a pharmaceutical grade mineral oil is a general antiseptic for first-aid purposes, such as for skin wounds, sores, etc.

Iodine monochloride can be rolled with the alkylated polymer in the mill at room temperature until a stable homogenous adduct is obtained containing about 16% total iodine and 4% total chlorine. The available iodine will be about 10% and the available chlorine about 2.5%. The resulting adduct is a brown powder or viscous liquid soluble in hydrocarbons containing at least six carbon atoms. A 10% by weight of the adduct in such hydrocarbon can be readily dispersed with a surfactant such as, for example, the condensation product of 1 mole of nonyl phenol with 5 moles of ethylene oxide diluted with water to yield a dispersion containing 1.6% total iodine and .4% total chlorine. The aqueous dispersion shows bleaching, deodorizing and sterilizing activity.

Iodine monobromide is also rolled with the alkylated polymer in the mill at room temperature until a stable homogenous adduct is obtained containing about 12% total iodine and 8% total bromine. The available iodine will be about 8% and the available bromine about 5%. The resulting adduct is a brown powder or viscous liquid product soluble in hydrocarbons which can be used in the same manner as the iodine-monochloride adduct.

The iodine adducts containing up to 32% of total iodine and 16% of available iodine based on the weight of the alkylated polymer are substantially nontoxic and non-irritating to skin. They are readily incorporated in powders, ointments, salves, suppositories, and any toiletry preparation, i.e., cosmetics and soaps to yield antiseptic and germicidal compositions which impart a soft, smooth and soothing effect to the skin.

The halogen adducts are soluble in a wide variety of organic compounds. In addition to those heretofore mentioned, they are also soluble in surface active agents such as polyglycol ethers of alkyl phenols and fatty alcohols, polyglycol ether esters of higher fatty acids, mono- and di-phosphate esters of polyglycol ethers of alkylated phenols and fatty alcohols, sulfate esters of polyglycol ethers of alkylated phenols and fatty alcohols, and such solutions diluted with water wherein the percent of available iodine may range from 0.1% to 10%. Such solutions are excellent antiseptics for cleansing dirt, grease and oils from skin wounds. Similar solutions of the iodine-monochloride and -monobromide adducts are particularly useful in cleaning, bleaching, sterilizing and sanitizing operations by washing, spraying, etc.

The halogen adducts can also be prepared by vacuum distilling a solution of the alkylated polymer in 100 sec. solv. containing in suspension crystalline iodine, iodine-monochloride or -bromide whereby the solvent is removed yielding a solid mass of the adduct on cooling. During this process and the mixing process by grinding and heating, some of the available iodine is converted to iodine ion. The percent of available iodine and percent of iodide ion is readily determined by the procedure outlined in "The Chemistry of Polyvinylpyrrolidone-Iodine" by S. Sigia, Journal of the American Pharmaceutical Association, vol. XLIV, No. 3, page 203, March 1957.

The following examples will show how some of the alkylated polymers of heterocyclic N-vinyl monomers are first prepared and then halogenated to yield stable halogen adducts.

EXAMPLE 1

A homopolymer of N-vinyl-2-pyrrolidone K–90 (30 grams, 0.27 equivalent) was dissolved in 225 mls. of hexanol, and then 75.7 grams (0.27 m.) of α-eicosene and 4.0 grams (0.027 m.) of di-t-butyl peroxide added. The flask containing the resulting mixture was purged with nitrogen and heated for 41 hours at 125–130° C. with agitation. The final solution was subjected to vacuum distillation and 106 grams and 100 sec. solvent were added as the hexanol was removed. A total of 220 ml. of solvent was recovered, corresponding to 97.8% of hexanol. The clear residue (209.9 grams), which solidified slowly on standing to a soft waxy solid, contained 12.4% by weight of solution of unreacted α-eicosene, indicating 65.4% alkylation based on the α-eicosene employed.

In determining the average mole percent of the lactam moieties that were alkylated, the following equation was used in this and subsequent examples:

The average mole percent of lactam moieties alkylated (grafted) equals $$\frac{\text{Moles of } \alpha\text{-olefin used (percent of olefin reacted—max. percent of olefin homopolymerized)} \times 100}{\text{Moles of lactam employed}}$$

Applying the equation to Example 1, the following results were obtained:

$$\frac{0.27(65.4\% - 54.4\% \times 5\%) \times 100}{0.27} = 62\%$$

The soft waxy solid is soluble in aliphatic and aromatic hydrocarbons, such as pentene, benzene, toluene; alcohols such as butanol, hexanol, etc.; halogenated hydrocarbons such as tetrachloroethylene and the like.

Into an eight-ounce jar filled with polyethylene liner were placed 20 grams of the alkylated polymer and 20 ceramic balls. After grinding by rolling for one hour 1.1 grams of iodine crystals (20% based on the polyvinyl pyrrolidone content) were added and the mixture rolled for 24 hours. The mixture was then heated at 60° C. for another 24 hours, at which time the iodine adduct melted. After cooling to room temperature, the adduct was reground by rolling. The iodine adduct contained 5.2% of total iodine and 3.1% of available iodine.

In this and in the following examples, available iodine determinations were made by titrating with sodium thiosulfate in water or in methanol to a potentiometric end point. For total iodine the microdetermination of iodine by the Parr bomb and Goldberg titration were used.

EXAMPLE 2

125 grams of poly(N-vinyl piperidone), (1.0 mole), were dissolved in 300 grams of normal amyl alcohol and after the addition of 168 grams (1.0 mole) of α-dodecene and 14.6 grams (0.1 mole) of di-t-butyl peroxide, the mixture was heated and maintained at 120–130° C. for 10 hours. Then a second addition of 7.3 grams of peroxide (0.05 mole) was made and heating continued. The reaction mixture was cooled after a total of 16 hours and analyzed. It was found to contain 1.2% by weight of solution of unreacted α-dodecene, corresponding to 95.6% alkylation (graft) based on the amount of α-olefin charged.

After stripping the amyl alcohol and unreacted α-dodecene, a clear viscous fluid was obtained while hot which solidified on cooling to room temperature to a clear flexible solid. It is insoluble in water, but soluble in all other polar and non-polar solvents.

Based on the structural studies of the alkylated polymer and its thermally degraded products by VPC, IR, NMR and elemental analysis, the 90% of the piperidone moieties alkylated (grafted) on the average (calculated by the equation of Example 1) showed the following isomeric distribution of the alkyl groups:

|  | Percent |
|---|---|
| 3-position of the piperidone moiety | 65–75 |
| 6-position of the piperidone moiety | 10–5 |
| α-Vinyl carbon atom of the piperidone moiety | 25–20 |

To 20 grams of the resulting clear flexible solid there were added 1.7 grams of iodine and the mixture ball milled for one day at room temperature. The mixture was then heated at 90° C. for another day and then cooled to room temperature. The resulting iodine adduct was then reground in the ball mill. After one month storage, it contained 7.7% total iodine and 4.7% available iodine.

EXAMPLE 3

A 70/30 (by weight) copolymer of N-vinyl piperidone and vinyl acetate weighing 100 grams was dissolved in 200 grams of hexanol followed by the addition of 140 grams (0.5 mole) of α-eicosene and 7.3 grams (0.05 mole) of di-t-butyl peroxide. The mixture was heated to 120°–130° C. and maintained for 24 hours. The product, after cooling, was analyzed and found to contain 2.73% by weight of solution of unreacted α-eicosene corresponding to 91% alkylation based on the olefin charged.

After the removal of hexanol and volatiles in vacuum, a very viscous fluid was obtained while hot which solidified to a hard waxy solid at room temperature. The product is insoluble in water, but soluble in all non-polar solvents and partially soluble in the very polar solvents such as formamide, methanol, acetonitrile, etc.

To twenty grams of the waxy solid 1.2 grams of iodine were added and the mixture treated exactly as in Example 2. After one month storage, it contained 5.7% of total iodine and 3.4% of available iodine.

EXAMPLE 4

Poly(N-vinyl-ε-caprolactam), (34.8 grams, 0.25 mole), was dissolved in 200 grams of hexanol and after the addition of 67.2 grams (0.3 mole) of α-hexadecene and 4.4 grams (0.03 mole) of di-t-butyl peroxide, the solution was heated and maintained at 120°–135° C. After 15 hours a second addition of peroxide (3.3 grams) was made and heating continued. At the completion of 26 hours (total time), the reaction mixture was cooled and analyzed for the α-olefin. The solution was found to contain 1.61% by weight of the solution of unreacted hexadecene corresponding to 95.5% alkylation based on hexadecene charged.

After stripping off the hexanol and volatiles in vacuum, a very viscous fluid was obtained at room temperature. It is soluble in all aliphatic and aromatic hydrocarbons, esters, ketones, halogenated hydrocarbons, and other polar and non-polar solvents.

Based on the structural studies of the alkylated polymer and its thermally degraded products by VPC, IR, NMR and elemental analysis, the 100% of the caprolactam moieties alkylated on the average (calculated by the equation of Example 1), showed the following isomeric distribution of the alkyl groups:

3-position of the caprolactam moiety _____ 75–85
7-position of the caprolactam moiety _____ 20–15
α-Vinyl carbon atom of the caprolactam moiety __ 5–0

Twenty grams of the viscous alkylated polymer were treated with 1.4 grams of iodine as in Example 2. After one month storage, the complexed alkylated polymer contained 6.5% total iodine and 3.9% available iodine.

EXAMPLE 5

Polyvinyl-5-methyl-pyrrolidone K–35 (125 grams, 1.0 mole) was dissolved in 200 grams of methyl isobutyl carbinol and then 280 grams (1.0 mole) of alpha-eicosene and 22 grams (0.15 mole) of di-t-butyl peroxide added. The resulting mixture was heated for 16 hours at 130–145° C. with agitation. The resulting solution was subjected to monomer analysis which indicated total absence of polyvinyl-5-methyl-pyrrolidone and only 4% by weight of the solution of unreacted alpha-eicosene corresponding to 91% alkylation based on the alpha-eicosene employed. The product solution was then stripped in vacuum and all volatiles removed. The 100% product obtained was a viscous light yellow fluid while hot, but which solidified into a hard, waxy solid. The product is soluble in aliphatic hydrocarbons such as mineral oils, etc., and in polar solvents such as alcohols, ketones, esters, etc., but insoluble in water.

Based on the structural studies of the alkylated polymer and its thermally degraded products by VPC, IR, NMR and elemental analysis, the 86.4% of the 5-methyl-pyrrolidone moieties alkylated (grafted) on the average (calculated by the equation of Example 1) showed the following isomeric distribution of the alkyl groups:

Percent
3-position of the 5-methyl-pyrrolidone moiety ___ 80–90
5-position of the 5-methyl-pyrrolidone
  moiety _____ Negligible
α-Vinyl carbon atom of the 5-methyl-pyrrolidone_ 20–10

Twenty grams of the viscous alkylated polymer were treated with 2.6 grams of iodine as in Example 2. After one month storage, the complexed alkylated polymer contained 6.1% total iodine and 3.7% available iodine.

EXAMPLE 6

A solution of the following ingredients was prepared and charged into a stainless steel rocker bomb.

Polyvinylpyrrolidone K–30—222 grams, 2 moles
SD40 Ethanol—330 grams
di-Tertiary-butyl peroxide—30 grams The bomb was connected to a weighed cylinder of ethylene, heated and rocked. A temperature of 120–130° C. was maintained in the bomb and ethylene continuously fed through a diaphragm valve at a maximum pressure of 400 p.s.i.a. Adjustments in pressure of ethylene were continuously made as the latter was absorbed. A total of 149 grams of ethylene was injected into the bomb within 15.75 hours while maintaining the same temperature and pressure conditions. The bomb was then cooled and the contents discharged. A sample of the solution was placed in vacuum and dried for several days at 90°–100° C. The dried material was analyzed for nitrogen by Kjeldahl and found to contain 8.3 percent of nitrogen. The percent of ethylene in the product based on nitrogen was 34.1%.

Into an eight-ounce jar fitted with a polyethylene liner there were placed 20 grams of the above-obtained alkylated polymer and 20 ceramic balls. After grinding by rolling the jar for one hour, one gram of iodine crystals (10.4% based on the polyvinylpyrrolidone content) was added and the mixture rolled for 24 hours. Thereafter, the jar was placed in an oven at 60° C. and kept there for 24 hours to melt the complex. After cooling to room temperature, the mass was reground by rolling to yield a fine powder.

The properties of the resulting iodine adduct are as follows:

Color _____ 118.
Mannheim flow temperature, ° C. _____ Yellow-orange.
Available iodine, percent _____ 3.3.
Total iodine, percent _____ 6.0.
Ratio, available/total _____ 0.55.
Toluene extraction, supernate _____ Pale amber.
Carbon tetrachloride extraction,
  supernate _____ Yellow.

EXAMPLE 7

Into a one-liter, four-necked flask, equipped with stirrer, thermometer, nitrogen inlet and reflux condenser, the following ingredients were charged:

N-vinyl-2-pyrrolidone, 111 grams (1.0 mole)
α-Eicosene, 140 grams (0.5 mole)
Methyl isobutyl carbinol, 200 grams
di-t-Butyl peroxide, 11.0 grams (0.075 mole)

The flask was then purged with nitrogen and heated. When the temperature reached around 120° C. an exothermic reaction initiated, but the temperature was controlled and maintained at 120–135° C. After 16 hours of reaction, the experiment was discontinued and the contents analyzed. The results showed the absence of any N-vinyl-2-pyrrolidone and 2.73% by weight of the solution of unreacted α-eicosene, corresponding to 91% consumption. The product after the total removal of the solvent and volatiles is a waxy solid at room temperature. It is soluble in alcohols and aliphatic and aromatic hydrocarbons, but insoluble in water.

The N-vinyl-2-pyrrolidone moieties in the copolymer that were alkylated on the average showed the following isomeric distribution:

Position substitution: Percent
  Eicosyl in 3-position _____ 70–80
  Eicosyl in 5-position _____ 10–5
  Eicosyl on α-vinyl carbon atom _____ 20–15

Twenty grams of the waxy solid were treated with 2.3 grams of iodine as in Example 2. After one month storage the iodine complex contained 5.4% total iodine and 3.2% available iodine.

EXAMPLE 8

Into a one-liter, four-necked flask equipped with stirrer, thermometer, nitrogen inlet and reflux condenser, the following materials were charged:

N-vinyl-2-piperidone=125 grams (1.0 mole)
α-Octadecene=252 grams (1.0 mole)
Normal butanol=200 grams
di-t-Butyl peroxide=14.6 grams (0.1 mole)

The flask was purged thoroughly with nitrogen and heated. The contents were maintained at reflux (120° C. pot) for 30 hours and then cooled and analyzed. The analyses showed the total absence of N-vinyl-2-piperidone and the presence of only 3.05% by weight of solution of unreacted α-octadecene, corresponding to 92.9% of α-octadecene consumed in the reaction.

When all solvent and volatiles were stripped in vacuum, a clear viscous fluid weighting 371 grams was obtained.

Percent
The mole percent of α-octadecene copolymerized
  and alkylated _____ 88.26
Minimum mole percent of α-octadecene copolymerized _____ 1.0
Minimum mole percent of N-vinyl-2-piperidone
  moieties alkylated on the average _____ 78.26

The N-vinyl-2-piperidone moieties in the copolymer that were alkylated on the average showed the following isomeric distribution:

Position substitution: Percent
- Octadecyl in 3-position ------------------ 60–70
- Octadecyl in 6-position ------------------ 25–20
- Octadecyl in α-vinyl carbon atoms ------- 15–10

Twenty grams of the resulting viscous fluid were treated with 0.8 gram of iodine as in Example 2. After one month storage the iodine complex contained 3.8% total iodine and 2.3% available iodine.

EXAMPLE 9

Into a one-liter, four-necked reaction flask, equipped with stirrer, thermometer, nitrogen inlet and reflux condenser, the following materials were charged:

N-vinyl-ε-caprolactam = 139 grams (1.0 mole)
α-Octadecene = 214 grams (0.85 mole)
Methyl isobutylcarbinol = 294 grams
di-t-Butyl peroxide = 18.5 grams (0.127 mole)

The flask was then purged thoroughly with nitrogen, heated and maintained at 125–135° C. for 24 hours. The contents when analyzed showed the absence of N-vinyl-ε-caprolactam and the presence of 4.54% by weight of the solution of unreacted α-octadecene, corresponding to 81.5% of α-octadecene consumed in the reaction. After stripping the solvent and volatiles in vacuum, the product obtained is a very viscous fluid soluble in all non-polar solvents.

Percent
- The mole of α-octadecene copolymerized and alkylated -------------------------------- 74.43
- Minimum mole percent of α-octadecene copolymerized -------------------------------- 1.17
- Minimum mole percent of N-vinyl-ε-caprolactam moieties alkylated on the average ------------ 55.8

The N-vinyl-ε-caprolactam moieties in the copolymer that were alkylated on the average showed the following isomeric distribution:

Position substitution: Percent
- Octadecyl in 3-position ------------------ 50–60
- Octadecyl in 7-position ------------------ 30–25
- Octadecyl on α-vinyl carbon atom -------- 20–15

Twenty grams of the resulting viscous fluid were treated with 4.8 grams of iodine as in Example 2. After one month storage, the iodine complex contained 10.7% total iodine and 1.4% available iodine.

EXAMPLE 10

Into a one-liter, four-necked flask equipped with stirrer, thermometer, nitrogen inlet and reflux condenser, the following ingredients were charged:

N-vinyl succinimide = 62.5 grams (0.5 mole)
Methyl isobutylcarbinol = 150 grams
α-Eicosene = 182 grams (0.65 mole)
di-t-Butyl peroxide = 15 grams (0.1 mole)

The flask was purged with nitrogen, heated and maintained at a range of 120–140° C. for 30 hours. The contents were then cooled and analyzed and found to contain only a trace of N-vinyl succinimide and 3.66% by weight of solution of unreacted α-eicosene, corresponding to 91.8% consumption of α-eicosene in the reaction. After stripping the solvent and volatiles in vacuum, the product is a viscous fluid while hot, solidifying upon cooling to room temperature to a waxy solid. It is soluble in all non-polar solvents, but insoluble in water.

Percent
- The mole percent of α-eicosene copolymerized and alkylated ------------------------------ 87.21
- Minimum mole percent of α-eicosene copolymerized -------------------------------- 0.77
- Minimum mole percent of N-vinyl succinimide moieties alkylated on the average ------------ 100

The N-vinyl succinimide moieties in the copolymer that were alkylated on the average showed 80–90% eicosyl substitution in the 3-position (in both of the alpha to carbonyl carbon atoms) and 10–20% eicosyl substitution on the α-vinyl carbon atom.

Twenty grams of the resulting waxy solid were treated with 2.6 grams of iodine as in Example 2. After one month storage the iodine complex contained 6.1% total iodine and 3.7% available iodine.

EXAMPLE 11

Into a one-liter, four-necked flask equipped with stirrer, thermometer, nitrogen inlet and reflux condenser, the following materials were charged:

N-vinyl-2-pyrrolidone = 55.5 grams (0.5 mole)
C$_{42}$ α-olefin obtained by the trimerization of α-tetradecene = 294 grams (0.5 mole)
Methyl isobutylcarbinol = 120 grams
di-t-Butyl peroxide = 15 grams (0.1 mole)

The flask was purged thoroughly with nitrogen and heated. The contents were maintained at reflux for 24 hours and then cooled and analyzed. The analysis showed the total absence of N-vinyl-2-pyrrolidone and only 7.75% by weight of the solution of unreacted C$_{42}$ α-olefin, corresponding to 87.2% consumption of the α-olefin.

When all solvent and volatiles were stripped in vacuum, an amber colored wax was obtained which is soluble in mineral oil and other nonpolar solvents.

Twenty grams of the amber colored wax were treated with 1.3 grams of iodine as in Example 2. After one month storage the iodine complex contained 3.1% total iodine and 1.9% available iodine.

EXAMPLE 12

Into a two-liter, four-necked flask equipped with stirrer, thermometer, nitrogen inlet and reflux condenser the following ingredients were charged:

N-vinyl-2-pyrrolidone = 111 grams (1.0 mole) (74%)
Vinyl acetate = 39 grams (0.45 mole) (26%)
α-Hexadecene = 336 grams (1.5 mole)
Methyl isobutylcarbinol = 200 grams
di-t-Butyl peroxide = 15 grams (0.1 mole)

After a thorough purge with nitrogen the contents were heated. At about 105° C. of pot temperature, a vigorous reflux of vinyl acetate (B.P. 72–73° C.) was observed and the temperature slowly increased as the refluxing decreased. The contents were maintained at 120–135° C. for 16 hours and then 10.0 more grams of the peroxide were added and the reaction continued for another 8 hours. (Total peroxide = 25.0 grams or 0.17 mole.) The analysis of the solution showed the total absence of N-vinyl-2-pyrrolidone, and only 3.3% of α-hexadecene equivalent to 23.5 grams of the olefin. The alkylated terpolymer, after the removal of the solvent, was a clear viscous fluid having a molecular weight of 9,000 and is soluble in hexane, kerosene, mineral oil, and other nonpolar solvents.

Twenty grams of the resulting viscous fluid were treated with 2.0 grams of iodine as in Example 2. After one month storage the iodine complex contained 4.8% total iodine and 2.9% available iodine.

EXAMPLE 13

Into a one-liter, four-necked flask equipped with stirrer, thermometer, nitrogen inlet and reflux condenser, the following materials were charged:

N-vinyl caprolactam = 75.0 grams (0.54 mole)
Ethyl acrylate = 75.0 grams (0.75 mole)
n-Amyl alcohol = 200 grams (solvent)
Alpha-dodecene = 225.0 grams (1.34 moles)
di-t-Butyl peroxide = 10.0 grams (0.0685 mole)

The flask was then purged with nitrogen and the contents heated while a mild nitrogen pressure was maintained on the flask. A slight exotherm was observed when the pot temperature reached 105° C., accompanied with vigorous reflux. But as the pot temperature increased, the rate of reflux decreased. The contents were maintained at reflux temperatures (125–135° C.) for eight hours and then a second addition of 15.0 grams peroxide was made (total=25.0 grams, 0.17 mole) and the refluxing continued for 22 more hours. At the end of this period, no residual N-vinyl caprolactam and ethyl acrylate could be detected on analysis. However, the residual α-dodecene was found to be 3.67% by weight of the solution, corresponding to 22.0 grams unreacted dodecene or 90.2% consumption of the α-olefin. The contents were then subjected to vacuum stripping with final stripping conditions of 130–140° C. pot temperature at 0.5–1.0 mm. Hg for one-half hour. The alkylated terpolymer product thus obtained is a clear amber viscous fluid and soluble in all nonpolar solvents such as hydrocarbons and mineral oil, but still soluble in polar solvents such as alcohols, ketones, amides and esters.

Twenty grams of the viscous fluid were treated with 3.5 grams of iodine as in Example 2. After one month storage the iodine complex contained 8.0% total iodine and 4.8% available iodine.

It is interesting to note that by employing 1 mole of a specific heterocyclic N-vinyl monomer such as, for example, N-vinyl-2-pyrrolidone with varying molar ratios ranging from 0.1 to 0.5 of α-olefins of 4 carbon atoms and a mixture of α-olefins in the $C_{16-20}$ range in the simultaneous copolymerization and alkylation procedure of Example 7 above, a variety of alkylated copolymers having differing physical characteristics are obtained as may be noted from Table 1.

In addition to being soluble in higher alcohols, etc., as previously noted, the halogen adducts of the alkylated polymers prepared in accordance with the present invention are also soluble in anhydrous ethanol and such alcohol solutions containing from 2.5% to 8% by weight of the halogen adducts of the alkylated polymers, especially the iodine complexes, may be formulated in the established manner with the available "Freons" or mixtures thereof as propellants in sealed containers to yield sprayable aerosols for application as fungicides and antiseptics.

The halogen adducts of the alkylated polymers prepared in accordance with the present invention are also soluble in ethylenglycol monomethyl ether. The halogen adducts may be employed in a range from 1 to 10% by weight in such solvent for germicidal, bactericidal, fungicidal and disinfecting purposes.

From the foregoing specification, it becomes clearly evident that the halogen adducts of alkylated polymers of heterocyclic N-vinyl monomers having a carbonyl function adjacent to the nitrogen in their heterocyclic moieties differ in appearance and solubility characteristics from the halogen adducts (complexes) of polyvinylpyrrolidone and copolymers of N-vinyl pyrrolidone and copolymers of N-vinyl pyrrolidone and other non-heterocyclic polymerizable monomers. The latter are reddish-brown amorphous powders and essentially soluble in water, whereas the former, i.e., halogen adducts of the alkylated polymers, range in appearance from light tan to dark tan, yellow tan and yellow orange, and are essentially insoluble in water, but soluble in a variety of organic solvents and materials in which they display their fungicidal, antiseptic and disinfecting characteristcs. Their solubility in lower and higher alcohols, fatty and other unctuous materials is attributable to the presence of at least one alkyl

TABLE 1

| | 1 Mole of N-Vinyl-2-Pyrrolidone Reacted With— | | | |
|---|---|---|---|---|
| | 0.45 mole $C_{16-20}$ α-olefin | 0.11 mole $C_{16-20}$ α-olefin | 0.5 mole $C_4$ α-olefin | 0.22 mole $C_4$ α-olefin |
| Sample No. | 1 | 2 | 3 | 4 |
| Physical form at 25° C. | Off-white solid | White granular solid. | Off-white granular solid. | White granular solid. |
| Density, gm./cc. at 23° C. | 0.98 | 1.03 | 1.09 | 1.09. |
| Average mol. weight | 9,500 | 20,000 | 19,000 | 16,000. |
| Softening point | 30° C. | 120° C. | 121° C. | 157° C. |
| Melting range (Mannheim Block) | 83–90° C. | 146–152° C. | 131–140° C. | 188–195° C. |
| Solubility Based on 10% of Alkylated Copolymer in Listed Solvents | | | | |
| Water | Insol | Emulsion | Dispersible [1] | Dispersible.[1] |
| Ethanol | Sol | Sol | Sol | Sol. |
| Toluene | Sol | Partly sol | Partly sol | Dispersible,[1] sol. hot. |
| Mineral oil | Sol | do | do | Insol. |
| Tetrachloroethylene | Sol | Sol. hot | D.C.[2] | Insol. |

[1] Dispersible denotes stable cloudy solution. [2] D.C.=dispersible cold.

The alkylated copolymers of Samples 1 to 4, inclusive, shown in Table 1, were treated with various weights, in grams, of elemental iodine as in Example 2. The results obtained were shown in Table 2.

substituent of at least 6 carbon atoms in at least one of the heterocyclic N-vinyl monomer moieties of the polymer. The solubility in hydrocarbons such as hexane, mineral oils, paraffin waxes, etc., increases as the chain length

TABLE 2

| Sample No. | 1 | 2 | | 3 | | 4 | |
|---|---|---|---|---|---|---|---|
| Alkylated copolymer in grams | 20.0 | 20.0 | 20.0 | 20.0 | 20.0 | 20.0 | 20.0 |
| Iodine crystals in grams | 2.0 | 3.2 | 6.4 | 3.2 | 6.4 | 3.6 | 7.2 |
| Total sample, grams | 22.0 | 23.2 | 26.4 | 23.2 | 26.4 | 23.6 | 27.2 |
| Percent I₂ added/total sample | 9.1 | 13.8 | 24.2 | 13.8 | 24.2 | 15.3 | 26.5 |
| Color of complex | ([1]) | ([2]) | ([1]) | ([3]) | ([2]) | ([3]) | ([3]) |
| Iodine analyses after 5 days: | | | | | | | |
| Percent available I | 5.95 | 9.13 | 15.46 | 9.01 | 15.89 | 9.95 | 16.67 |
| Percent total I | 9.22 | 13.75 | 26.01 | 14.31 | 26.25 | 17.31 | 27.76 |
| Iodine analyses after 1 month: | | | | | | | |
| Percent available I | 5.45 | 8.66 | 15.43 | 8.77 | 15.61 | 9.95 | 16.47 |
| Percent total I | 9.61 | 13.87 | 26.08 | 14.12 | 26.29 | 17.24 | 27.60 |

[1] Dark tan. [2] Light tan. [3] Yellow tan.

I claim:

1. A stable halogen adduct of an alkylated polymer of a heterocyclic N-vinyl monomer, having a carbonyl function adjacent to the nitrogen in its heterocyclic moiety selected from the class consisting of N-vinyl succinimide, N-vinyl diglycolylimide, N-vinyl glutarimide, N-vinyl-3-morpholinone, N-vinyl-5-methyl-3-morpholinone, N-vinyl-5-ethyl-3-morpholinone, N-vinyl oxazolidone and N-vinyl lactams of the formula:

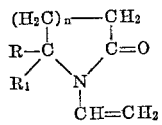

wherein R and $R_1$ are selected from the group consisting of hydrogen, methyl and ethyl, and $n$ is an integer of from 1 to 3, and containing in at least one of said moieties an alkyl group of from 6 to 42 carbon atoms, in which the halogen content of said adduct ranges from about 1% to about 30% by weight of said alkylated polymer, the said halogen selected from the class consisting of iodine, iodine monobromide and iodine monochloride.

2. A stable iodine adduct of an alkylated polymer of a heterocyclic N-vinyl monomer, having a carbonyl function adjacent to the nitrogen in its heterocyclic moiety selected from the class consisting of N-vinyl succinimide, N-vinyl diglycolylimide, N-vinyl glutarimide, N-vinyl-3-morpholinone, N - vinyl - 5-methyl-3-morpholinone, N-vinyl-5-ethyl-3-morpholinone, N-vinyl oxazolidone and N-vinyl lactams of the formula:

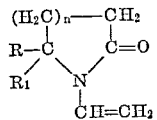

wherein R and $R_1$ are selected from the group consisting of hydrogen, methyl and ethyl, and $n$ is an integer of from 1 to 3, and containing in at least one of said moieties an alkyl group of from 6 to 42 carbon atoms, in which the iodine content ranges from about 1% to about 30% by weight of said alkylated polymer.

3. A stable iodine adduct of an alkylated polymer of N-vinyl lactam monomer of the formula:

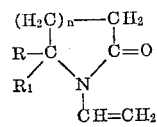

wherein R and $R_1$ are selected from the group consisting of hydrogen, methyl and ethyl, and $n$ is an integer of from 1 to 3, containing in at least one of the N-vinyl lactam units in the polymer an alkyl group of from 6 to 42 carbon atoms and in which the iodine content ranges from about 1% to about 30% by weight of said alkylated polymer.

4. A stable iodine adduct according to claim 2 wherein the said alkylated polymer is the alkylated homopolymer of N-vinyl-2-pyrrolidone.

5. A stable iodine adduct according to claim 2 wherein the said alkylated polymer is the alkylated homopolymer of N-vinyl piperidone.

6. A stable iodine adduct according to claim 2 wherein the said alkylated polymer is the alkylated homopolymer of N-vinyl-ε-caprolactam.

7. A stable iodine adduct according to claim 2 wherein the said alkylated polymer is the alkylated homopolymer of N-vinyl-5-methyl-2-pyrrolidone.

References Cited

UNITED STATES PATENTS

| | | |
|---|---|---|
| 2,667,473 | 1/1954 | Morner et al. |
| 2,706,701 | 4/1955 | Beller et al. |
| 2,739,922 | 3/1956 | Shelanski. |
| 2,754,245 | 7/1956 | Hosmer. |
| 2,821,519 | 5/1961 | Glickman. |
| 2,853,417 | 9/1958 | Werner et al. |
| 2,982,762 | 5/1961 | Voeks et al. _____ 260—88.1 |
| 3,136,755 | 9/1964 | Grosser et al. |
| 3,174,955 | 5/1965 | Black. |

JOSEPH L. SCHOFER, *Primary Examiner.*

HARRY WONG, JR., *Assistant Examiner.*

U.S. Cl. X.R.

260—88.1, 33.4, 31.2, 33.6, 28.5, 80.3, 80.72, 79.7, 85.7, 85.5, 63, 86.1, 80.72; 424—78, 80, 150